(12) United States Patent
Sun

(10) Patent No.: US 9,444,949 B2
(45) Date of Patent: Sep. 13, 2016

(54) SIMULATION APPARATUS, SIMULATION SYSTEM, AND SIMULATION METHOD THAT ENSURE USE OF GENERAL-PURPOSE PC

(71) Applicant: Kyocera Document Solutions Inc., Osaka (JP)

(72) Inventor: Zhenyu Sun, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/555,591

(22) Filed: Nov. 27, 2014

(65) Prior Publication Data

US 2015/0146237 A1 May 28, 2015

(30) Foreign Application Priority Data

Nov. 27, 2013 (JP) ................. 2013-245143

(51) Int. Cl.
*G06F 15/00* (2006.01)
*H04N 1/00* (2006.01)
(52) U.S. Cl.
CPC ........ *H04N 1/00053* (2013.01); *H04N 1/0001* (2013.01); *H04N 1/00079* (2013.01)
(58) Field of Classification Search
None
See application file for complete search history.

(56) References Cited

U.S. PATENT DOCUMENTS

| 2004/0073632 | A1* | 4/2004 | Simpson et al. | 709/220 |
| 2004/0230318 | A1* | 11/2004 | Shimizu | 700/1 |
| 2008/0221857 | A1* | 9/2008 | Casotto | 703/21 |
| 2010/0115335 | A1* | 5/2010 | Wylie et al. | 714/25 |
| 2010/0149579 | A1* | 6/2010 | Shah et al. | 358/1.14 |
| 2011/0307236 | A1 | 12/2011 | Ishii et al. | |

FOREIGN PATENT DOCUMENTS

JP 2011-258045 A 12/2011

\* cited by examiner

*Primary Examiner* — Helen Q Zong
(74) *Attorney, Agent, or Firm* — James Judge

(57) ABSTRACT

A simulation apparatus includes a status-transition-frequency input, a job status unit, a job-status simulating unit, an error-occurrence-rate input unit, and a device alert unit. The status-transition-frequency input unit receives an input of a status transition frequency of a job executable by a device. The job status unit simulates a status transition of the job based on the status transition frequency. The job-status simulating unit makes a transition of a status of the job based on the status transition by the job status unit as a simulation. The error-occurrence-rate input unit receives an input of an error occurrence rate of the job. The device alert unit makes a transition of a status of the device based on the error occurrence rate as a simulation.

4 Claims, 3 Drawing Sheets

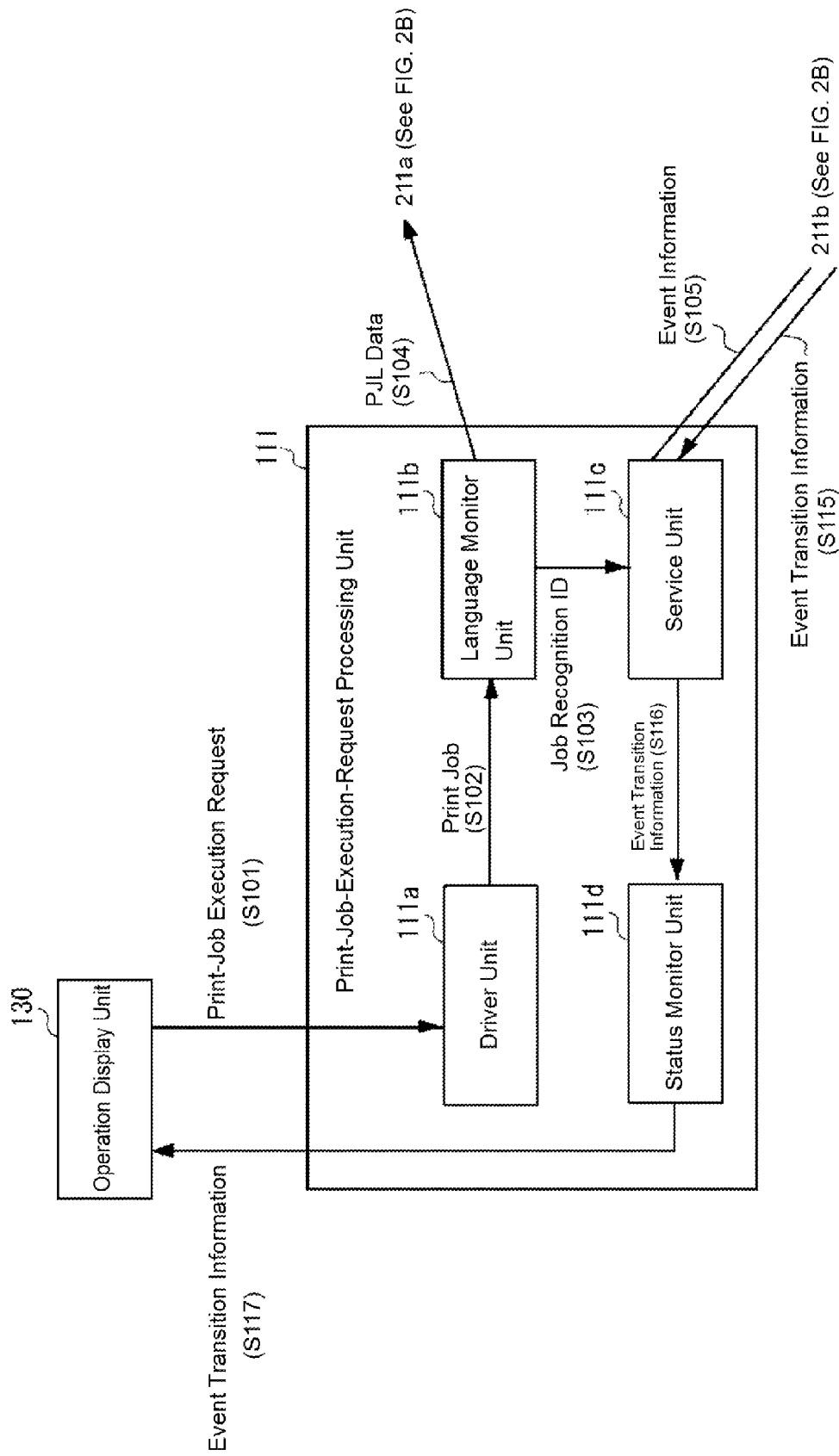

_US 9,444,949 B2_

SIMULATION APPARATUS, SIMULATION SYSTEM, AND SIMULATION METHOD THAT ENSURE USE OF GENERAL-PURPOSE PC

INCORPORATION BY REFERENCE

This application is based upon, and claims the benefit of priority from, corresponding Japanese Patent Application No. 2013-245143 filed in the Japan Patent Office on Nov. 27, 2013, the entire contents of which are incorporated herein by reference.

BACKGROUND

Unless otherwise indicated herein, the description in this section is not prior art to the claims in this application and is not admitted to be prior art by inclusion in this section.

A client apparatus such as a personal computer (PC) is connected to an image forming apparatus such as a printer and a multifunction peripheral via a network. By installing the driver corresponding to the image forming apparatus, this client apparatus can transmit an execution request for a job to the above-described image forming apparatus and can receive the execution result of the job from the above-described image forming apparatus. Accordingly, when an image forming apparatus with a new function has been developed, the driver compatible with the image forming apparatus is required. When the function of the image forming apparatus has been updated (the version has been upgraded), an update of the driver might be necessary. Accordingly, when a driver has been developed or updated, a verification test is necessary to verify whether the driver operates normally. However, to perform this verification test of the operation, it is necessary to transmit an execution request of a job from the developed or updated driver to an image forming apparatus or a simulation apparatus that simulates an image forming apparatus for the verification. For example, a known simulation apparatus reproduces time passage and timing of a real machine and shortens the execution time of simulation in the simulation apparatus.

SUMMARY

A simulation apparatus according to one aspect of the disclosure includes a status-transition-frequency input, a job status unit, a job-status simulating unit, an error-occurrence-rate input unit, and a device alert unit. The status-transition-frequency input unit receives an input of a status transition frequency of a job executable by a device. The job status unit simulates a status transition of the job based on the status transition frequency. The job-status simulating unit makes a transition of a status of the job based on the status transition by the job status unit as a simulation. The error-occurrence-rate input unit receives an input of an error occurrence rate of the job. The device alert unit makes a transition of a status of the device based on the error occurrence rate as a simulation.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 2A and 2B are diagrams illustrating software functional block configurations and data flows in a print-job-execution-request processing unit and a print-job-simulation-execution processing unit according to the one embodiment of the disclosure.

DETAILED DESCRIPTION

Figure 1:
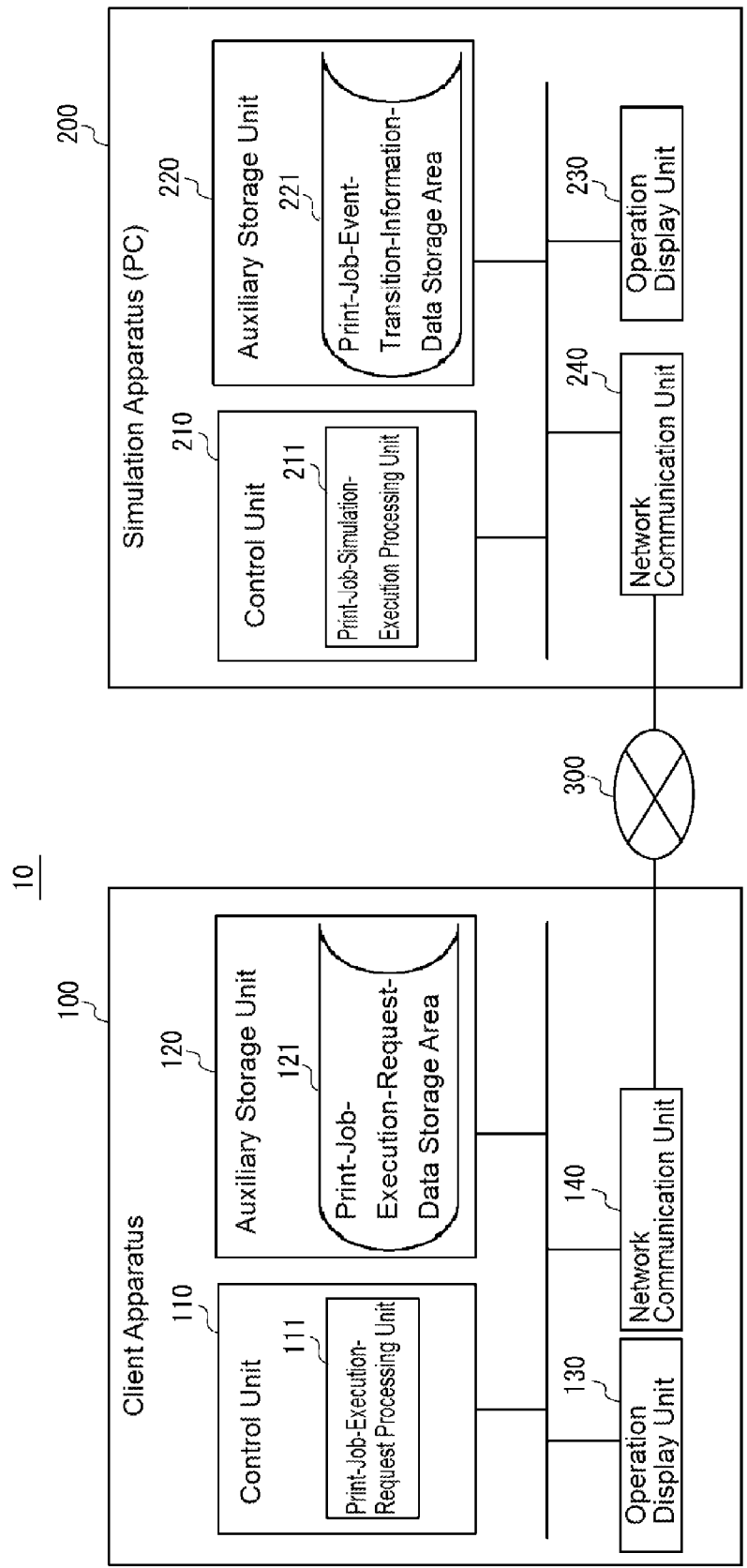
FIG. 1 is a diagram illustrating a functional block configuration of a simulation system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A description will be given of an embodiment of the disclosure with reference to the accompanying drawings. In the embodiment, an execution request of a print job is transmitted from a client apparatus to a simulation apparatus, which simulates an image forming apparatus, as one example of a device and then the simulation apparatus simulates the execution of the print job.

The functional configuration of a simulation system 10 in the embodiment will be described with reference to FIG. 1. The simulation system 10 illustrated in FIG. 1 includes a client apparatus 100 and a simulation apparatus 200. The client apparatus 100 is a PC such as a PC/AT compatible machine, a smart phone, a mobile phone, or a tablet terminal that allows an operation input of a user and includes an operation display unit that can display an operation result or notification. The simulation apparatus 200 is a PC such as a PC/AT compatible machine that allows an operation input of a user and includes an operation display unit that can display an operation result or notification. The client apparatus 100 and the simulation apparatus 200 are connected together via a network 300. A person responsible for the test (hereinafter referred to as the "user") who checks the operation of a driver transmits an execution request of a print job from the client apparatus 100 to the simulation apparatus 200. When the simulation apparatus 200 has received the execution request of the print job, the simulation apparatus 200 executes the simulation of the print job based on the frequency of transitions of a status that is the state of the print job (hereinafter referred to as the "status transition frequency") and on the error occurrence rate due to the execution of the print job (hereinafter referred to as the "printing-error occurrence rate"). The status transition frequency and the printing-error occurrence rate are preliminarily set by the user. The simulation apparatus 200 transmits the transition status of the print job to the client apparatus 100.

Firstly, the functional configuration of the client apparatus 100 will be described with reference to FIG. 1. As illustrated in FIG. 1, the client apparatus 100 includes a control unit 110, an auxiliary storage unit 120, an operation display unit 130, and a network communication unit 140. These respective portions are connected together via a bus or similar member in the configuration.

The control unit 110 includes a main storage unit such as a RAM and a ROM and a controller such as a central processing unit (CPU). The control unit 110 performs integrated control of the client apparatus 100 including various I/Os, an interface such as a universal serial bus (USB), a bus controller, and similar part. The control unit 110 includes a print-job-execution-request processing unit 111. The print-job-execution-request processing unit 111 transmits the execution request of the print job specified by the user to the simulation apparatus 200. The software functional configuration of the print-job-execution-request processing unit 111 will be described later.

The auxiliary storage unit 120 is an auxiliary storage device (also called a non-transitory recording medium) constituted of a flash memory and similar member, and stores a program and data for the process to be executed by the control unit 110. The auxiliary storage unit 120 includes a print-job-execution-request-data storage area 121 (a job-execution-request-data storing unit) that stores print-job-execution-request data to be transmitted to the simulation apparatus 200.

The operation display unit 130 includes an operation display panel to input the operation of the user and to display an operation result or notification.

The network communication unit 140 includes a LAN interface that can be attached and removed for connecting to the network 300. The LAN interface includes a network unit that performs intelligent transmission and reception by various network protocols such as TCP/IP, AppleTalk, and SMB.

The following describes the functional configuration of the simulation apparatus 200. As illustrated in FIG. 1, the simulation apparatus 200 includes a control unit 210, an auxiliary storage unit 220, an operation display unit 230, and a network communication unit 240. These respective portions are connected together via a bus or similar member in the configuration.

The control unit 210 includes a main storage unit such as a RAM and a ROM and a controller such as a CPU. The control unit 210 performs integrated control of the simulation apparatus 200 including various I/Os, an interface such as a USB, a bus controller, and similar part. The control unit 210 includes a print-job-simulation-execution processing unit 211. When the print-job-simulation-execution processing unit 211 has received a print-job execution request from the client apparatus 100, the print-job-simulation-execution processing unit 211 performs a process for executing a print job of an image forming apparatus as a simulation and transmits the transition status of the print job to the client apparatus 100. The software functional configuration of the print-job-simulation-execution processing unit 211 will be described later.

The auxiliary storage unit 220 is an auxiliary storage device constituted of a flash memory and similar member, and stores a program and data for the process to be executed by the control unit 210. The auxiliary storage unit 220 includes a print-job-event-transition-information-data storage area 221 (an event-transition-information-data storing unit) that stores event-transition information data of the print job to be transmitted to the client apparatus 100.

The operation display unit 230 includes an operation display panel to input the operation of the user and to display an operation result or notification.

The network communication unit 240 includes a LAN interface that can be attached and removed for connecting to the network 300. The LAN interface includes a network unit that performs intelligent transmission and reception by various network protocols such as TCP/IP, AppleTalk, and SMB.

Figure 2B:
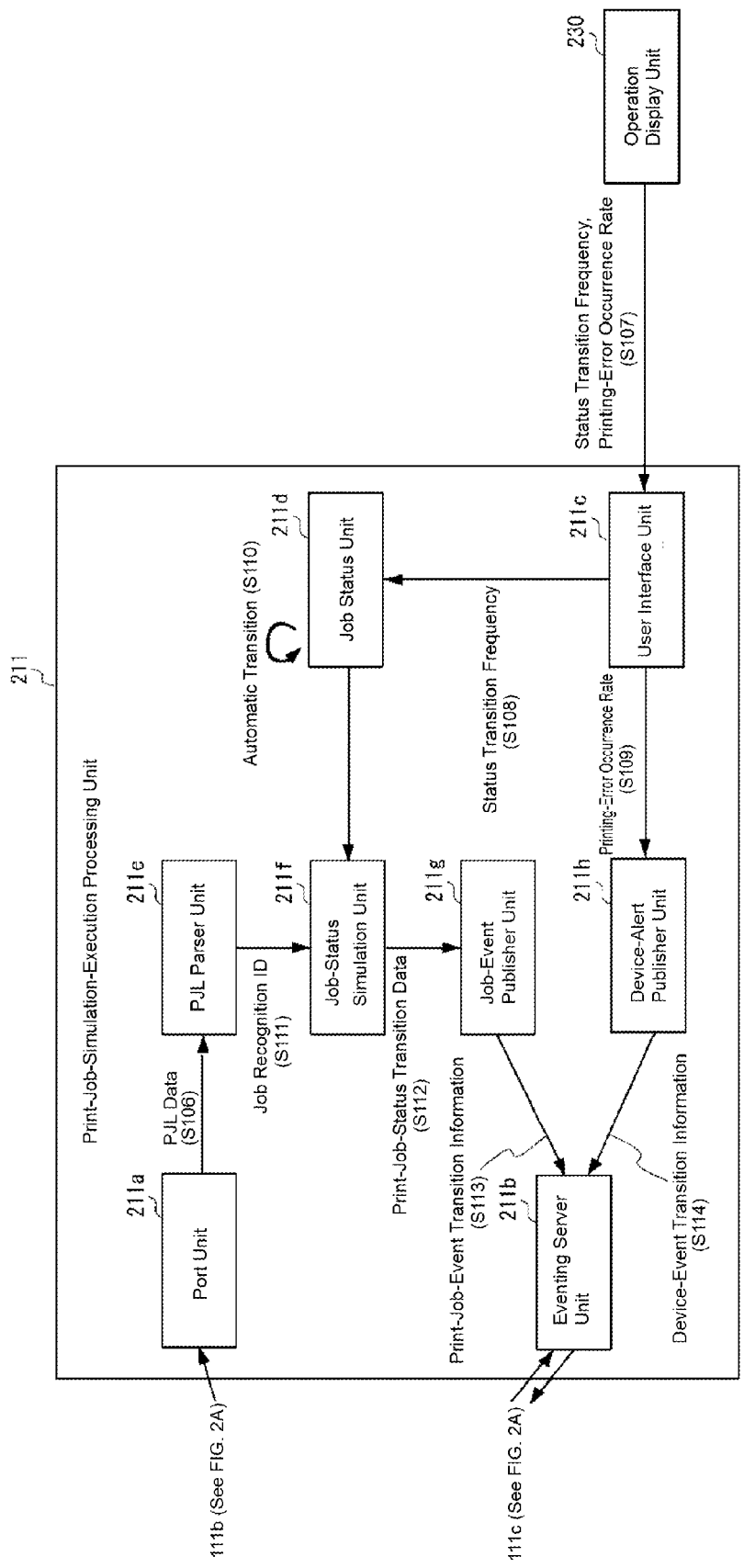

The following describes the software functional configurations of the print-job-execution-request processing unit 111 of the client apparatus 100 and the print-job-simulation-execution processing unit 211 of the simulation apparatus 200 according to the one embodiment of the disclosure with reference to FIGS. 2A and 2B. The print-job-execution-request processing unit 111 is constituted of software functions of a driver unit 111a (a job-execution-request input unit), a language monitor unit 111b (a job-execution-request transmitting unit), a service unit 111c, and a status monitor unit 111d. The print-job-simulation-execution processing unit 211 is constituted of software functions of a port unit 211a, an eventing server unit 211b, a user interface unit 211c (a status-transition-frequency input unit and an error-occurrence-rate input unit), a job status unit 211d, a print job language (PJL) parser unit 211e, a job-status simulation unit 211f (a job-status simulating unit), a job-event publisher unit 211g (a job-event-transition-status generating unit), and a device-alert publisher unit 211h (a device alert unit and a device-event-transition-status generating unit).

The driver unit 111a is a driver of the image forming apparatus that accepts a print-job execution request from the operation display unit 130 when a print job is transmitted to the simulation apparatus 200, which simulates the image forming apparatus, to simulate the execution. The language monitor unit 111b is a processing unit that acquires the job recognition ID of the print job and generates PJL data that is executable by the simulation apparatus of the image forming apparatus from the print job. The service unit 111c is a processing unit that transmits information (hereinafter referred to as the "event information") related to an event such as the execution request of the print job or receives information (hereinafter referred to as the "event transition information") when the status of the event makes a transition. The status monitor unit 111d is a processing unit that displays the event transition information on the operation display unit 130.

The port unit 211a is a port dedicated to receiving the PJL data from the client apparatus 100. The eventing server unit 211b is a processing unit that receives the event information from the client apparatus 100 and transmits the event transition information to the client apparatus 100. The user interface unit 211c is a processing unit that inputs the status transition frequency and the printing-error occurrence rate, which are set by the user from the operation display unit 230. The job status unit 211d is a processing unit that automatically makes a transition of the status of the print job to the status of waiting for execution, the middle of execution, the completion of execution, or similar state based on the status transition frequency as a simulation. The PJL parser unit 211e is a processing unit that converts the PJL data into data that can be handled in the program. The job-status simulation unit 211f is a processing unit that generates print-job-status transition data where the status transition of the print job for the job recognition ID is set. The job-event publisher unit 211g is a processing unit that generates print-job-event transition information, which can be recognized by the user, from the print-job-status transition data. The device-alert publisher unit 211h is a processing unit that generates device-event transition information, which can be recognized by the user, as a simulation of an alert (hereinafter referred to as the "device alert") to be output when an event occurs in the device based on the printing-error occurrence rate.

The following describes the procedure of the execution of job simulation according to the embodiment of the disclosure with reference to FIGS. 2A and 2B. Firstly, when the user issues an execution request of a print job from the operation display unit 130 of the client apparatus 100, a job execution request is output from the operation display unit 130 to the control unit 110. The control unit 110 stores the job execution request in the print-job-execution-request-data storage area 121 and outputs the job execution request to the driver unit 111a. Additionally, when the user inputs a status transition frequency and a printing-error occurrence rate from the operation display unit 230 of the simulation apparatus 200, the status transition frequency and the printing-error occurrence rate are output from the operation display unit 230 to the user interface unit 211c. The description will be given in the order of steps illustrated in FIGS. 2A and 2B.

Step S101

Firstly, in the client apparatus 100, the driver unit 111a receives the input of the print-job execution request from the operation display unit 130.

Step S102

Subsequently, the driver unit 111a outputs the print job of the print-job execution request to the language monitor unit 111b.

Step S103

Subsequently, the language monitor unit 111b acquires the job recognition ID of the print job when the print job is input, and outputs the job recognition ID to the service unit 111c.

Step S104

Subsequently, the language monitor unit 111b converts the print job into PJL data and sets the job recognition ID, and then transmits the PJL data to the port unit 211a of the simulation apparatus 200.

Step S105

Subsequently, when the service unit 111c has received the input of the job recognition ID from the language monitor unit 111b, the service unit 111c transmits event information as the execution request for the print job of the job recognition ID to the eventing server unit 211b of the simulation apparatus 200.

Step S106

Subsequently, in the simulation apparatus 200, when receiving the PJL data, the port unit 211a outputs the PJL data to the PJL parser unit 211e.

Step S107

Subsequently, the user interface unit 211c inputs the status transition frequency and the printing-error occurrence rate, which are set by the user from the operation display unit 230.

Step S108

Subsequently, the user interface unit 211c outputs the status transition frequency to the job status unit 211d.

Step S109

Subsequently, the user interface unit 211c outputs the printing-error occurrence rate to the device-alert publisher unit 211h.

Step S110

Subsequently, the job status unit 211d automatically makes a transition of the status of the print job to the status of waiting for execution, the middle of execution, the completion of execution, or similar state based on the status transition frequency as a simulation.

Step S111

Subsequently, when the PJL parser unit 211e has received the PJL data from the port unit 211a, the PJL parser unit 211e converts the PJL data into executable data to extract the job recognition ID and outputs the job recognition ID to the job-status simulation unit 211f.

Step S112

Subsequently, when the job-status simulation unit 211f has received the input of the job recognition ID from the PJL parser unit 211e and received the input of the simulated status transition of the print job from the job status unit 211d, the job-status simulation unit 211f generates print-job-status transition data where the status transition for the job recognition ID is set and outputs the print-job-status transition data to the job-event publisher unit 211g.

Step S113

Subsequently, when the job-event publisher unit 211g has received the input of the print-job-status transition data from the job-status simulation unit 211f, the job-event publisher unit 211g converts the print-job-status transition data into print-job-event transition information, which can be recognized by the user, and outputs the print-job-event transition information to the eventing server unit 211b.

Step S114

Subsequently, when the device-alert publisher unit 211h has received the input of the printing-error occurrence rate from the user interface unit 211c, the device-alert publisher unit 211h generates device-event transition information, which can be recognized by the user, from the printing-error occurrence rate and outputs the device-event transition information to the eventing server unit 211b.

Step S115

Subsequently, when the eventing server unit 211b has received the event information transmitted from the client apparatus 100 in Step S105 and received the inputs of the device-event transition information from the device-alert publisher unit 211h and the print-job-event transition information from the job-event publisher unit 211g, the eventing server unit 211b transmits the event transition information, to which these pieces of information are set, to the service unit 111c of the client apparatus 100, which has transmitted the event information. The eventing server unit 211b stores the event transition information in the print-job-event-transition-information-data storage area 221.

Step S116

When the service unit 111c has received the input of the event transition information from the eventing server unit 211b, the service unit 111c outputs the event transition information to the status monitor unit 111d.

Step S117

When the status monitor unit 111d has received the input of the event transition information from the service unit 111c, the status monitor unit 111d displays the event transition information on the operation display unit 130.

In the simulation system 10 of the embodiment as described above, the status transition frequency is set by the user from the operation display unit 230 of the simulation apparatus 200. This causes the job status unit 211d to automatically make a transition of the status of the print job to the status of waiting for execution, the middle of execution, the completion of execution, or similar state based on the status transition frequency as a simulation. Accordingly, the job-status simulation unit 211f can simulate the status transition of the print job corresponding to the job recognition ID. Additionally, when the user sets the printing-error occurrence rate from the operation display unit 230 of the simulation apparatus 200, the device-alert publisher unit 211h can simulate the device alert, which is output when the event occurs at the device, based on the printing-error occurrence rate. Accordingly, with the print-job-execution-request processing unit 111 having the software configuration as illustrated in FIGS. 2A and 2B, the user can perform the process for executing the print job as a simulation and can check the statuses of the print job and the device as if the statuses would actually transition. Additionally, the print-job-simulation-execution processing unit 211 with the software configuration as illustrated in FIGS. 2A and 2B causes simulating the statuses of the print job and the device as if the statuses would actually transition.

Here, while in the simulation system 10 the example constituted of one client apparatus 100 and one simulation apparatus 200 has been described, the simulation system 10 is not limited to this configuration. For example, it is possible to have the configuration that includes a plurality of the client apparatuses 100 and one simulation apparatus 200 or the configuration that includes a plurality of the client apparatuses 100 and a plurality of the simulation apparatuses 200. As just described, when the plurality of the client apparatuses 100 are provided, the client apparatus 100 transmits not only the job recognition ID but also the recognition ID of the client apparatus 100 to the simulation apparatus 200. This causes the simulation apparatus 200 to transmit the event transition information to the client apparatus 100 that has been transmitted the PJL data and the event information.

Additionally, the print-job-execution-request data is stored in the print-job-execution-request processing unit 111 of the client apparatus 100 of the embodiment. The print-job-event transition information is stored in the print-job-event-transition-information-data storage area 221 of the simulation apparatus 200. Accordingly, the user can simplify verify the simulation result of the print job executed by the simulation apparatus 200.

While in the embodiment the process for simulating the execution request of the print job has been described, this should not be construed in a limiting sense. The job executable by the image forming apparatus, for example, a job for converting document data into image data and a job for faxing image data can be simulated. As just described, when the jobs of different request types are simulated, the user can change the status transition frequency and the printing-error occurrence rate to the status transition frequency and the error occurrence rate corresponding to the job.

These simulation apparatus and simulation system of the disclosure can use a general-purpose PC as a simulation apparatus of an image forming apparatus without using an actual image forming apparatus or an apparatus with expensive hardware resources. Accordingly, the verification test of the driver can be performed at low cost.

The disclosure has been described with the specific embodiment above. The above-described embodiment is an example of the disclosure. The disclosure is not obviously limited to this embodiment.

The disclosure is appropriate for simulating the image forming apparatus, and the device targeted for the simulation is not limited to the image forming apparatus. The disclosure is applicable to a general simulation of an apparatus that can execute a job.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus for simulating an image forming apparatus, the simulation apparatus simulating execution of print jobs, transmitted from a client apparatus, via a driver, the simulation apparatus comprising:
    an operation display unit;
    a network communication unit for receiving print-job execution requests from the client apparatus; and
    a control unit including a central processing unit (CPU) configured for i) receiving a print-job execution request from the client apparatus, ii) executing the print job, and iii) transmitting status transitioning of the print job to the client apparatus, the control unit including the CPU being further configured for
        receiving print-job-language data and a job recognition ID for the print job from the client apparatus,
        receiving input of status transition frequency and of printing-error occurrence rate, set via the operation display unit,
        automatically transitioning the status of a print job to one of at least waiting-for-execution, middle-of-execution, or completion-of-execution, based on the status transition frequency,
        i) converting the print-job-language data into data that can be handled by a program executed by the print-job-simulation-execution processing unit, and ii) extracting the job recognition ID,
        generating print-job-status transition data whereby status transitioning of a print job is set, the print job corresponding to the job recognition ID output from the print-job-language parser unit,
        generating print-job-event transition information for the job recognition ID from the print-job-status transition data,
        generating device-event transition information for the job recognition ID, as a device alert when an event occurs, based on the error occurrence rate, and
        transmitting event transition information for the job recognition ID, including the print-job-event transition information and the device-event transition information, to a client apparatus having transmitted a print-job execution request.

2. A simulation system, comprising:
    a simulation apparatus connected to a network; and
    a client apparatus connected to the network; wherein
    the simulation apparatus simulates an image forming apparatus by simulating execution of print jobs, transmitted from the client apparatus, via a driver, and includes a first operation display unit, a network communication unit for receiving print-job execution requests from the client apparatus, and a control unit including a central processing unit (CPU) configured for i) receiving a print-job execution request from the client apparatus, ii) executing the print job, and iii) transmitting status transitioning of the print job to the client apparatus, the control unit including the CPU being further configured for
        receiving print-job-language data and a job recognition ID for the print job from the client apparatus,
        receiving input of status transition frequency and of printing-error occurrence rate, set via the operation display unit,
        automatically transitioning the status of a print job to one of at least waiting-for-execution, middle-of-execution, or completion-of-execution, based on the status transition frequency,
        i) converting the print-job-language data into data that can be handled by a program executed by the print-job-simulation-execution processing unit, and ii) extracting the job recognition ID, generating print-job-status transition data whereby status transitioning of a print job is set, the print job corresponding to the job recognition ID output from the print-job-language parser unit, generating print-job-event transition information for the job recognition ID from the print-job-status transition data, generating device-event transition information for the job recognition ID, as a device alert when an event occurs, based on the error occurrence rate, and transmitting event transition information for the job recognition ID, including the print-job-event transition information and the device-event transition information, to the client apparatus as having transmitted a print-job execution request; and the client apparatus includes a second operation display unit for receiving input of print-job execution requests, and a print-job-execution-request processing unit for transmitting a print-job execution request to the simulation apparatus, the print-job-execution-request processing unit including a driver unit, a language monitor unit, a service unit, and a status monitor unit, the driver unit being for i) accepting a print-job execution request from the second operation display unit, and ii) outputting the print job for the print-job execution request to the language monitor unit, the language monitor unit being for i) acquiring the job recognition ID from the print job, ii) generating the print-job-language data for the print job, iii) outputting the job recognition ID to the service unit, and iv) transmitting the print-job-language data and the job recognition ID to the simulation apparatus, the service unit being for i) transmitting the print-job execution request for the job recognition ID to the simulation apparatus, and ii) receiving the event transition information for the job recognition ID, and the status monitor unit being for displaying on the second operation display unit the event transition information for the job recognition ID.

3. The simulation system according to claim 2, wherein:
the client apparatus further includes a print-job-execution-request-data storage area for storing the print-job execution requests; and
the simulation apparatus further includes a print-job-event-transition-information-data storage area for storing the event transition information.

4. A simulation method by a simulation apparatus connected to a network and a client apparatus connected to the network, the simulation apparatus simulating an image forming apparatus by simulating execution of print jobs, transmitted from the client apparatus, via a driver, the simulation method comprising:

via the simulation apparatus
receiving print-job-language data and a job recognition ID for a print-job from the client apparatus;
receiving a print-job execution request from the client apparatus;
receiving input of status transition frequency and of printing-error occurrence rate;
automatically transitioning the status of the print job to one of at least waiting-for-execution, middle-of-execution, or completion-of-execution, based on the status transition frequency;
converting the print-job-language data into data that can be handled by a program executed by the simulation apparatus;
extracting the job recognition ID;
generating print-job-status transition data whereby status transitioning of the print job is set, the print job corresponding to the job recognition ID;
generating print-job-event transition information for the job recognition ID from the print-job-status transition data;
generating device-event transition information for the job recognition ID, as a device alert when an event occurs, based on the error occurrence rate; and
transmitting event transition information for the job recognition ID, including the print-job-event transition information and the device-event transition information, to the client apparatus having transmitted the print-job execution request; and via the client apparatus
acquiring the job recognition ID from the print job;
generating the print-job-language data for the print job;
transmitting the print-job-language data and the job recognition ID to the simulation apparatus using the driver;
transmitting the print-job execution request for the job recognition ID to the simulation apparatus;
receiving the event transition information for the job recognition ID; and
displaying the event transition information for the job recognition ID.

* * * * *